(12) United States Patent
Naganuma

(10) Patent No.: US 8,835,066 B2
(45) Date of Patent: Sep. 16, 2014

(54) CIRCULATION SYSTEM FOR A FUEL CELL

(75) Inventor: Yoshiaki Naganuma, Nisshin (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 995 days.

(21) Appl. No.: 12/087,114

(22) PCT Filed: Feb. 8, 2007

(86) PCT No.: PCT/JP2007/052657
§ 371 (c)(1),
(2), (4) Date: Jun. 26, 2008

(87) PCT Pub. No.: WO2007/094380
PCT Pub. Date: Aug. 23, 2007

(65) Prior Publication Data
US 2009/0053566 A1    Feb. 26, 2009

(30) Foreign Application Priority Data

Feb. 15, 2006 (JP) ................................. 2006-038279

(51) Int. Cl.
*H01M 8/04* (2006.01)

(52) U.S. Cl.
CPC ...... *H01M 8/04089* (2013.01); *H01M 8/04253* (2013.01); *Y02E 60/50* (2013.01); *H01M 8/0432* (2013.01); *H01M 8/04753* (2013.01)
USPC ......................................................... 429/429

(58) Field of Classification Search
USPC ................................................... 429/433, 429
See application file for complete search history.

(56) References Cited

U.S. PATENT DOCUMENTS

| | | | |
|---|---|---|---|
| 2002/0146602 A1 | 10/2002 | Abe et al. | |
| 2003/0232226 A1 | 12/2003 | Morishima et al. | |
| 2004/0091827 A1* | 5/2004 | Sugawara et al. | 431/2 |
| 2007/0087239 A1* | 4/2007 | Mulvenna et al. | 429/26 |

FOREIGN PATENT DOCUMENTS

| | | | |
|---|---|---|---|
| JP | 2003-86214 A | 3/2003 | |
| JP | 2003-178782 A | 6/2003 | |
| JP | 2004-22198 A | 1/2004 | |
| JP | 2005-259464 * | 9/2005 | H01M 8/04 |
| JP | 2005-259464 A | 9/2005 | |
| JP | 2005-268179 A | 9/2005 | |
| JP | 2006-164750 A | 6/2006 | |

* cited by examiner

*Primary Examiner* — Ula C Ruddock
*Assistant Examiner* — Frank Chernow
(74) *Attorney, Agent, or Firm* — Kenyon & Kenyon LLP

(57) ABSTRACT

An object of the present invention is to provide a fuel cell system capable of avoiding damage to a circulation pump at a low temperature to improve system efficiency. The fuel cell system of the present invention includes a fuel gas circulation system having a circulation path which re-circulates, through a fuel cell, a fuel off gas discharged from the fuel cell, and a circulation pump which feeds under pressure the fuel off gas in the circulation path; and a controller which controls driving of the circulation pump. The controller stops the driving of the circulation pump at a predetermined low temperature.

5 Claims, 5 Drawing Sheets

CIRCULATION SYSTEM FOR A FUEL CELL

This is a 371 national phase application of PCT/JP2007/052657 filed 8 Feb. 2007, which claims priority of Japanese Patent Application No. 2006-038279 filed 15 Feb. 2006, the contents of which are incorporated herein by reference.

TECHNICAL FIELD

The present invention relates to a fuel cell system which circulates a fuel off gas to a fuel cell.

BACKGROUND ART

A fuel cell system is known which again supplies, to a fuel cell, a fuel off gas discharged from the fuel cell with a circulation pump (e.g., see Japanese Patent Application Laid-Open Nos. 2003-178782 and 2004-22198). The fuel off gas includes generated water or has a high humidity. Therefore, in a low-temperature atmosphere after the system stops, the generated water which might remain in the circulation pump or condensed moisture is sometimes frozen. When a torque is generated in the circulation pump having a frozen state during restart of the system, an impeller of the circulation pump might be broken, and the circulation pump might thus be damaged. To prevent the freezing of the circulation pump, in the fuel cell system disclosed in Japanese Patent Application Laid-Open No. 2003-178782, during the system stop, a dry fuel gas is introduced into the circulation pump. The fuel off gas in the circulation pump is replaced with the dry fuel gas, whereby the fuel cell system performs scavenging processing.

DISCLOSURE OF THE INVENTION

However, in a fuel cell system disclosed in Japanese Patent Application Laid-Open No. 2003-178782, the fuel gas has to be wasted in order to perform the scavenging processing. Therefore, an efficiency of the whole fuel cell system deteriorates.

An object of the present invention is to provide a fuel cell system that can avoid damage to a circulation pump at a low temperature to improve system efficiency.

To achieve the above object, a fuel cell system of the present invention includes: a fuel gas circulation system having a circulation path which circulates, through a fuel cell, a fuel off gas discharged from the fuel cell, and a circulation pump which feeds under pressure the fuel off gas in the circulation path; and a controller which controls driving of the circulation pump. The controller stops the driving of the circulation pump at a predetermined low temperature.

According to this constitution, even if the circulation pump is frozen, the driving of the circulation pump is stopped at the predetermined low temperature, so that the damage to the circulation pump at the low temperature can be avoided. Moreover, scavenging processing does not necessarily have to be performed, and a power loss of the circulation pump is not generated at the predetermined low temperature, so that the system efficiency can be improved.

Here, when the circulation pump is not driven, a fuel gas concentration in the fuel off gas to be supplied to the fuel cell might lower. However, the present inventors have found that a water vapor partial pressure in the fuel off gas is substantially zero at the low temperature, for example, below a freezing point and that a cross leak amount of nitrogen is also small. Therefore, even when the driving of the circulation pump is stopped at the predetermined low temperature as in the present invention, a sufficient fuel gas concentration in the fuel off gas can be maintained while avoiding the damage to the circulation pump and improving the system efficiency.

Preferably, the controller may stop the driving of the circulation pump at a time when the fuel cell system is started at the predetermined low temperature.

In consequence, the fuel cell system can appropriately be started.

Preferably, the predetermined low temperature may be a temperature of the fuel cell or an outside air temperature of 0 degree or less.

According to this constitution, at the temperature of 0 degree or less at which the circulation pump might be frozen, the driving of the circulation pump is stopped, so that the damage to the circulation pump can appropriately be avoided. On the other hand, the fuel gas concentration in the fuel off gas can be secured.

Preferably, the fuel cell system of the present invention may include a temperature sensor which detects a temperature of the fuel cell. The controller may stop the driving of the circulation pump at a time when the temperature detected by the temperature sensor is the predetermined low temperature or less, whereas the controller may allow the driving of the circulation pump at a time when the temperature detected by the temperature sensor is higher than the predetermined low temperature.

In general, the temperature of the fuel cell fluctuates with an operation of the fuel cell system. For example, during startup of the fuel cell system, the temperature of the fuel cell is substantially equal to the outside air temperature, but during the operation of the fuel cell system, the temperature of the fuel cell of, for example, a solid polymer electrolytic type is 60 to 80° C. As in the present invention described above, when the temperature of the fuel cell is higher than the predetermined low temperature, the driving of the circulation pump can be allowed to shift to an original specification. Moreover, when the temperature of the fuel cell is the predetermined low temperature or less, the driving of the circulation pump is stopped, whereby the fuel gas concentration in the fuel off gas can be secured while appropriately avoiding the damage to the circulation pump.

Preferably, the fuel cell system of the present invention may include: a purge passage which is connected to the circulation path and which discharges the fuel off gas; and a purge valve which opens and closes the purge passage. The controller may open and close the purge valve during the stop of the driving of the circulation pump.

According to this constitution, the purge valve is opened, whereby the fuel off gas together with generated water and impurities included in the fuel off gas can be discharged to the purge passage. In consequence, even when the fuel gas concentration in the fuel off gas lowers during the stop of the driving of the circulation pump, the fuel gas concentration in the fuel off gas can increase.

Preferably, the controller may stop the driving of the circulation pump at the predetermined low temperature in preference to another condition. For example, at the predetermined low temperature, the driving of the circulation pump may be stopped in preference to conditions such as stop of supply of the fuel gas to the fuel cell, opening of the purge valve, and stop of power generation of the fuel cell.

In another preferable mode of the present invention, a fuel gas system which supplies a fuel gas to the fuel cell and which discharges the fuel off gas from the fuel cell may be constituted. There is a temperature at which a magnitude of a system loss of the fuel gas system in a case where the driving of the circulation pump is stopped reverses a magnitude of a system loss of the fuel gas system in a case where the circulation pump is driven, and the predetermined low temperature may be the reversing temperature or less.

According to this constitution, the driving and the stopping of the circulation pump can be switched based on the temperature at which the system loss reverses. In consequence, the system loss of the fuel gas system can be reduced, and the whole system efficiency can be improved.

More preferably, the fuel gas system may have a purge passage which discharges the fuel off gas, and a purge valve which opens and closes the purge passage. The system loss of the fuel gas system in a case where the driving of the circulation pump is stopped may is composed of a purge loss due to opening of the purge valve, and the system loss of the fuel gas system in a case where the circulation pump is driven may is composed of the purge loss due to the opening of the purge valve and a power loss due to the driving of the circulation pump.

In another preferable mode of the present invention, the fuel cell system of the present invention may further comprise: a purge passage which is connected to the circulation path and which discharges the fuel off gas; and a purge valve which opens and closes the purge passage. There is a first temperature at which a purge amount in a case where the purge valve is opened and closed in a state in which driving of the circulation pump is stopped is larger than an allowable amount, and the predetermined low temperature may be the first temperature or less.

According to this constitution, the purge amount can appropriately be suppressed during stop of the driving of the circulation pump, and the whole system efficiency can be improved.

BEST MODE FOR CARRYING OUT THE INVENTION

A fuel cell system according to a preferable embodiment of the present invention will hereinafter be described with reference to the accompanying drawings.

First Embodiment

Figure 1:
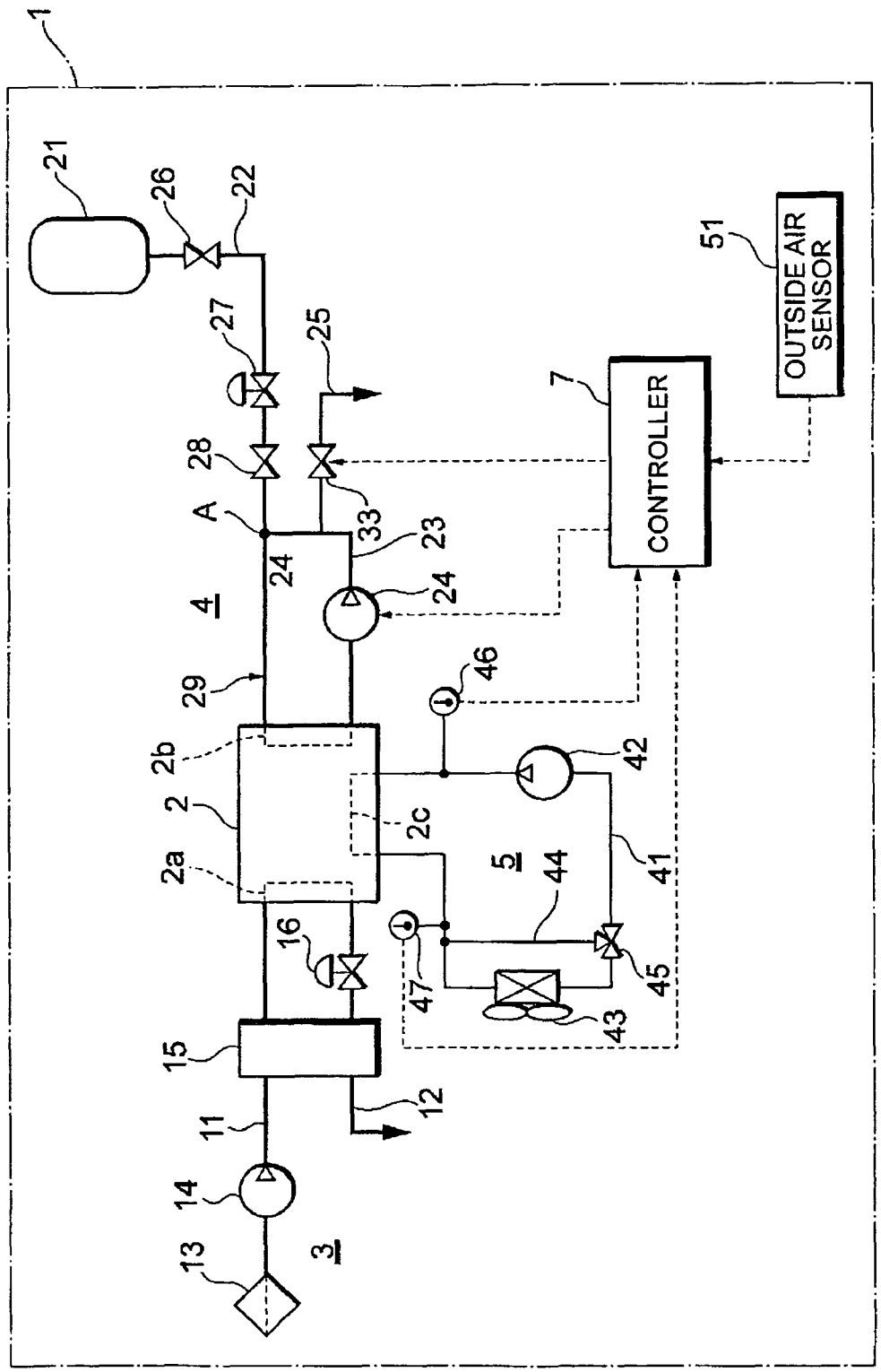
FIG. 1 is a block diagram of a fuel cell system according to an embodiment of the present invention.

As shown in FIG. 1, a fuel cell system 1 includes a fuel cell 2, an oxidizing gas piping system 3, a fuel gas piping system 4, a refrigerant piping system 5, and a controller 7 that controls the system 1 as a whole.

The fuel cell 2 is constituted of, for example, a solid polymer electrolytic type. The fuel cell 2 includes a stack structure in which a large number of unit cells are laminated. The unit cell of the fuel cell 2 has an air electrode on one surface of an electrolyte comprised of an ion exchange film, and a fuel electrode on the other surface thereof, and further has a pair of separators so that the air electrode and the fuel electrode are sandwiched therebetween. An oxidizing gas is supplied to an oxidizing gas channel 2a of one separator, and a fuel gas is supplied to a fuel gas channel 2b of the other separator. The fuel cell 2 generates a power owing to an electrochemical reaction of the supplied fuel gas and the oxidizing gas. The electrochemical reaction in the fuel cell 2 is a heat generating reaction, and the fuel cell 2 of the solid polymer electrolytic type has a temperature of about 60 to 80° C.

The oxidizing gas piping system 3 supplies air (oxygen) as the oxidizing gas to the fuel cell 2. The oxidizing gas piping system 3 has a supply path 11 through which the oxidizing gas to be supplied to the fuel cell 2 flows, and a discharge path 12 through which an oxidizing off gas discharged from the fuel cell 2 flows. The supply path 11 is provided with a compressor 14 which takes the oxidizing gas via a filter 13, and a humidifier 15 which humidifies the oxidizing gas fed under pressure by the compressor 14. The oxidizing off gas flowing through the discharge path 12 passes through a back pressure adjustment valve 16 for use in water content exchange in the humidifier 15, and is finally discharged as an exhaust gas from the system to the atmosphere.

The fuel gas piping system 4 supplies hydrogen as the fuel gas to the fuel cell 2. The fuel gas piping system 4 has a hydrogen supply source 21, a supply path 22 through which hydrogen gas to be supplied to the fuel cell 2 flows, a circulation path 23 for returning, to a joining part A of the supply path 22, a hydrogen off gas (a fuel off gas) discharged from the fuel cell 2, a pump 24 which feeds under pressure the hydrogen off gas from the circulation path 23 to the supply path 22, and a purge path 25 which is branched and connected to the circulation path 23.

The hydrogen supply source 21 is constituted of, for example, a high pressure tank, a hydrogen occluded alloy or the like, and constituted so that the hydrogen gas of, for example, 35 MPa or 70 MPa can be stored. When a source valve 26 of the hydrogen supply source 21 is opened, the hydrogen gas flows out to the supply path 22. A pressure of the hydrogen gas is finally reduced to, for example, about 200 kPa by a pressure reduction valve such as a pressure regulating valve 27, and supplied to the fuel cell 2.

A block valve 28 is provided on an upstream side of the joining part A of the supply path 22. A passage of a hydrogen gas circulation system (a fuel gas circulation system) 29 is constituted by connecting, in order, a channel on the downstream side of the joining part A of the supply path 22, the fuel gas channel 2b formed in the separator of the fuel cell 2, and the circulation path 23. The hydrogen gas circulation system 29 includes the pump 24 provided in the circulation path 23 described above.

The pump 24 (a circulation pump) may be constituted of any type, and is constituted of, for example, a volume type. The pump 24 includes, for example, a three-phase alternating current motor (not shown), and a compressor section having an impeller connected to a driving shaft of a motor. Driving and stopping of the motor are controlled by the controller 7. The pump 24 is driven by the motor to circulate the hydrogen off gas in the hydrogen gas circulation system 29 through the fuel cell 2, whereas the driving of the motor is stopped to stop the circulating of the hydrogen off gas.

The purge path 25 is provided with a purge valve 33 as a shutoff valve. The purge valve 33 appropriately opens during the operation of the fuel cell system 1, whereby impurities in the hydrogen off gas are discharged together with the hydrogen off gas to a diluter (not shown). Because the purge valve 33 opens, a concentration of the impurities in the hydrogen off gas of the circulation path 23 lowers, and a concentration of hydrogen in the circulated hydrogen off gas rises. Here, the impurities in the hydrogen off gas include water moisture such as generated water contained in the hydrogen off gas, and a nitrogen gas transmitted from the air electrode of the fuel cell 2 to the fuel electrode via the ion exchange film, that is, the cross leaked nitrogen gas.

The refrigerant piping system 5 supplies a refrigerant to the fuel cell 2 to cool the fuel cell 2. The refrigerant piping system 5 has a refrigerant channel 41 connected to a cooling channel 2c in the fuel cell 2, a cooling pump 42 on the refrigerant channel 41, a radiator 43 which cools the refrigerant discharged from the fuel cell 2, a bypass channel 44 which bypasses the radiator 43, and a switch valve 45 which sets circulation of the refrigerant through the radiator 43 and the bypass channel 44. The refrigerant channel 41 has a temperature sensor 46 near a refrigerant inlet of the fuel cell 2, and a temperature sensor 47 near a refrigerant outlet of the fuel cell 2. A refrigerant temperature detected by the temperature sensor 47 reflects an inner temperature (hereinafter referred to as the temperature of the fuel cell 2) of the fuel cell 2.

The controller 7 is constituted as a microcomputer containing a CPU, an ROM and an RAM. The CPU executes a desired operation in accordance with a control program to perform various processing and control such as control of the pump 24 described later. The ROM stores the control program and control data to be processed by the CPU. The RAM is used as any operation region mainly for control processing. The controller 7 inputs detection signals any type of pressure sensor and temperature sensors 46, 47 for use in the gas systems (3, 4) and the refrigerant system 5, an outside air temperature sensor 51 which detects an outside air temperature at which the fuel cell system 1 is disposed and the like. The controller 7 outputs control signals to various constituting elements such as the pump 24 and the purge valve 33.

Figure 2:
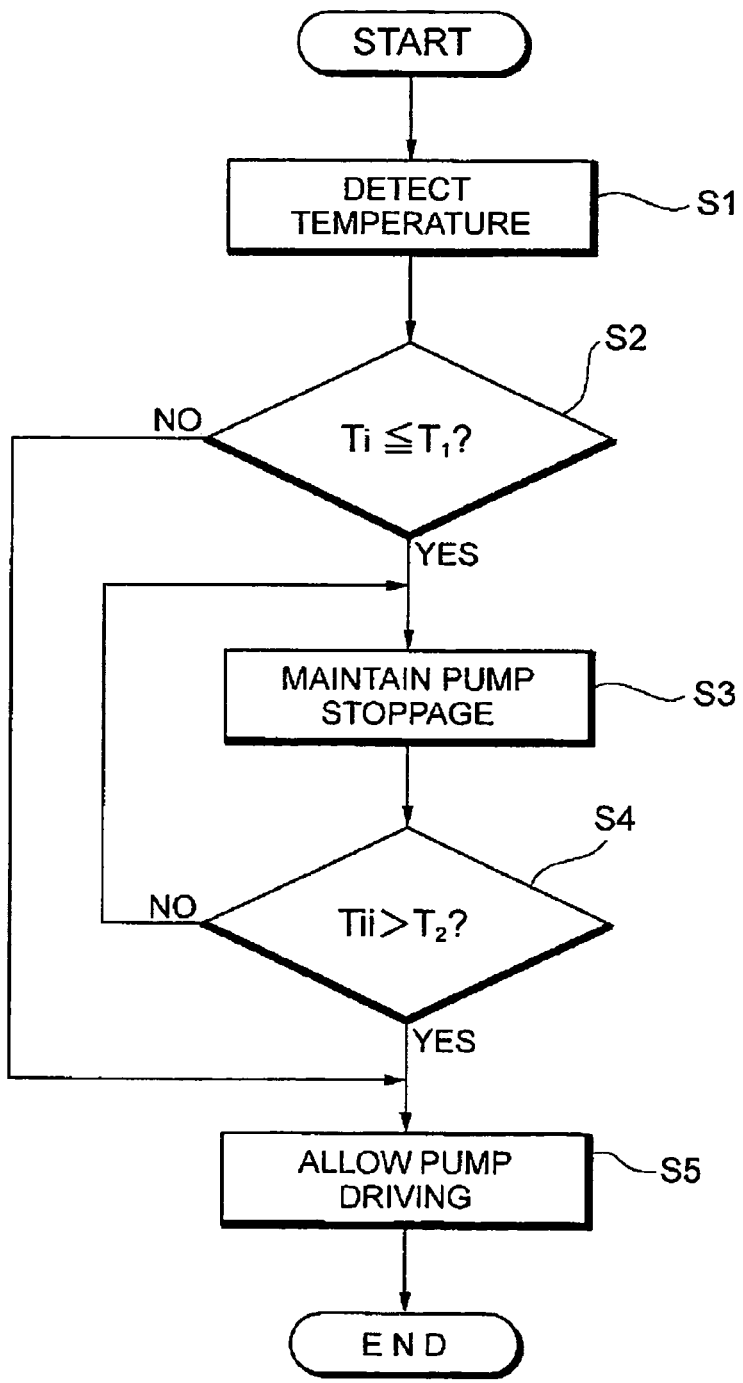
FIG. 2 is a flow chart showing a control example of a circulation pump according to the embodiment of the present invention.

FIG. 2 is a flow chart showing a control example of the pump 24 according to the present embodiment.

When the operation of the fuel cell system 1 is stopped and then the system is exposed to an environment below a freezing point, water moisture and generated water in the hydrogen off gas are condensed in a compressor section of the pump 24, whereby the pump 24 might be frozen. When a torque is forcibly generated in the frozen pump 24, the pump 24 could be damaged. Therefore, to operate the fuel cell system 1 with an improved efficiency while avoiding damage to the pump 24, the controller 7 executes the following program during startup of the fuel cell system 1. It is to be noted that this program may be executed even in a case where rotation of the pump 24 is temporarily discontinued or is stopped during the operation of the fuel cell system 1.

As shown in FIG. 2, in this program, first, any temperature associated with the fuel cell system 1 is detected (step S1). Specifically, the temperatures of the temperature sensors 45 and 46 disposed in the refrigerant piping system 5, and the outside air temperature sensor 51 are detected.

Subsequently, it is judged whether or not a detected temperature $T_i$ of at least one of these sensors 45, 46 and 51 is a predetermined temperature $T_1$ or less (step S2). The predetermined temperature $T_1$ is, for example, 0° C. Then, in a case where it is judged that the detected temperature $T_i$ is higher than the temperature $T_1$ (step S2: NO), it is judged that the pump 24 is not frozen, and the driving of the pump 24 is allowed (step S5).

Here, the temperature of the fuel cell 2 detected by the temperature sensor 47 is sometimes different from the outside air temperature detected by the outside air temperature sensor 51. This difference is made owing to a time (a time for which the system is left to stand) from stop of the fuel cell system 1 to restart thereof. For example, when the system is left to stand for a comparatively long time, there is only little difference between both the temperatures. However, when the system is left to stand for a comparatively short time, the temperature of the fuel cell 2 is often higher than the outside air temperature. On the other hand, the temperature of the pump 24 itself is better reflected by the outside air temperature sensor 51. Therefore, in the step S2, it is mainly judged whether or not the detected temperature $T_i$ of the outside air temperature sensor 51 is lower than the temperature $T_1$, and it is good to determine whether to maintain the stop of the driving of the pump 24 (step S3) or to allow the driving of the pump 24 (step S5).

In a case where it is judged that the detected temperature $T_i$ is the temperature $T_1$ and is, for example, a low temperature at which the pump 24 is frozen (step S2: YES), the driving of the pump 24 is stopped (step S3). That is, the controller 7 substantially stops the circulation of the hydrogen off gas in preference to another condition at the predetermined low temperature. Moreover, the hydrogen gas from the hydrogen supply source 21 to the fuel cell 2 and the oxidizing gas with the compressor 14 are supplied by the controller 7, whereby the fuel cell 2 generates the power. That is, the hydrogen off gas is not forcibly circulated through the fuel cell 2, and the fuel cell 2 generates the power. At this time, the stop of the driving of the pump 24 is maintained until a detected temperature $T_{ii}$ of the temperature sensor 47 exceeds a threshold value $T_2$ (step S4: NO).

Here, in the step S3, the fuel cell system 1 is operated in a state in which the pump 24 is stopped. However, even in this case, a high concentration of hydrogen in the unit cell of the fuel cell 2 can be maintained. This is because when the temperature of the fuel cell 2 is 0° C. or less, a water vapor partial pressure in the hydrogen off gas is substantially 0, and a cross leak amount of the nitrogen gas is small. Therefore, in a case where the temperature of the fuel cell 2 is 0° C. or less, even when the driving of the pump 24 is stopped, it can be prevented that the power generation efficiency in the fuel cell 2 lowers.

Needless to say, during the power generation of the fuel cell 2 in a state in which the driving of the pump 24 is stopped, it is preferable that the purge valve 33 appropriately opens to maintain a constantly high hydrogen concentration in the fuel cell 2. In this case, the number of times when the purge valve 33 is opened is preferably smaller than that during a usual operation (during the driving of the pump 24). In consequence, the purge amount can be suppressed, and a hydrogen use ratio in the fuel cell system 1 is increased, whereby the system efficiency can eventually be improved.

When the power generation of the fuel cell 2 is started, the temperature of the fuel cell 2 rises. Then, the water vapor partial pressure in the hydrogen off gas rises, and the cross leak amount of the nitrogen gas also increases, whereby the hydrogen concentration in the unit cell of the fuel cell 2 lowers. In this case, if the high hydrogen concentration in the unit cell is maintained only by opening and closing the purge valve 33, frequency of the opening and the closing of the purge valve 33 increases. As a result, the hydrogen use ratio lowers, and the system efficiency deteriorates.

To solve the problem, in the present embodiment, when the temperature of the fuel cell 2, that is, the detected temperature $T_{ii}$ of the temperature sensor 47 exceeds a certain threshold value $T_2$ (step S4: YES), the driving of the pump 24 is allowed (step S5). Here, the threshold value $T_2$ is higher than the above temperature $T_1$, and may be a temperature in excess of, for example, 0° C. Preferably, the threshold value $T_2$ is, for example, 20 to 30° C. in consideration of an operation temperature of 60 to 80° C. of the solid polymer type of fuel cell 2.

The processing shifts to the step S5, whereby a series of program concerning the pump 24 ends. Afterward, in the fuel cell system 1, the driving of the pump 24 is started, and usual control is performed based on a load of the fuel cell 2. That is, in the fuel cell system 1, the pump 24 is driven to circulate the hydrogen off gas through the fuel cell 2, whereby the hydrogen use ratio is increased. On the other hand, the purge valve 33 is appropriately opened, whereby the high hydrogen concentration in the hydrogen off gas is maintained.

As described above, according to the fuel cell system 1 of the present embodiment, the fuel cell 2 generates the power in a state in which the driving of the pump 24 is stopped during the startup below the freezing point. In consequence, even if the pump 24 is frozen, the driving (torque generation) of the pump is stopped, so that damage to the pump 24 can be avoided. Moreover, as the pump 24 is stopped, any power loss of the pump is not generated and the system efficiency can be improved.

Furthermore, the present inventors have obtained such a finding that below the freezing point, the water vapor partial pressure of the hydrogen off gas is substantially 0 and that the cross leak amount of the nitrogen gas is also small. Therefore, even when the pump 24 is stopped as described above, the high hydrogen concentration in the fuel cell 2 can be maintained, and the fuel cell 2 is appropriately allowed to generate the power. Moreover, even when the pump 24 is stopped, the hydrogen off gas does not have to be purged frequently or once, so that the purge amount of the hydrogen off gas can be suppressed. Therefore, the hydrogen use ratio can be increased while stopping the pump 24, and eventually the system efficiency can be improved.

Moreover, when the fuel cell 2 generates the power to warm to a predetermined temperature, that is, a predetermined condition ($T_{ii} > T_2$) is satisfied, the start of the driving of the pump 24 is allowed to shift to the usual control of the pump 24 and the purge valve 33. Therefore, according to the fuel cell system 1, either during the stop of the driving of the pump 24 or during the driving of the pump, the hydrogen concentration in the fuel cell 2 can be secured while improving the hydrogen use ratio.

On the other hand, below the freezing point at which the pump 24 is frozen, the pump 24 is not driven, so that a countermeasure against the freezing of the pump 24 can be simplified. For example, need for water discharge processing in the pump 24 after the operation stop of the fuel cell system 1, need for devising of such a structure that the pump 24 is not frozen or the like can be obviated. It is to be noted that the water discharge processing includes, as one example, scavenging processing of replacing the hydrogen off gas in the hydrogen gas circulation system 29 with the hydrogen gas from the hydrogen supply source 21.

Moreover, even if the pump 24 is frozen, the hydrogen off gas warmed by heat generated in the fuel cell 2 is introduced into the pump 24. Therefore, when the driving of the pump 24 is started, the hydrogen off gas introduced can unfreeze the frozen pump 24.

Second Embodiment

Next, a different respect of a fuel cell system 1 according to a second embodiment will mainly be described with reference to FIGS. 3 and 4. The embodiment is different from the first embodiment in that the temperatures $T_1$ and $T_2$ shown in FIG. 2 are changed. The temperatures $T_1$ and $T_2$ of the present embodiment are set by comparison of the system efficiency of a hydrogen system in a so-called dead end or circulation-less fuel cell system 100 with that of the hydrogen system in the circulation type fuel cell system 1 shown in FIG. 1.

Figure 3:
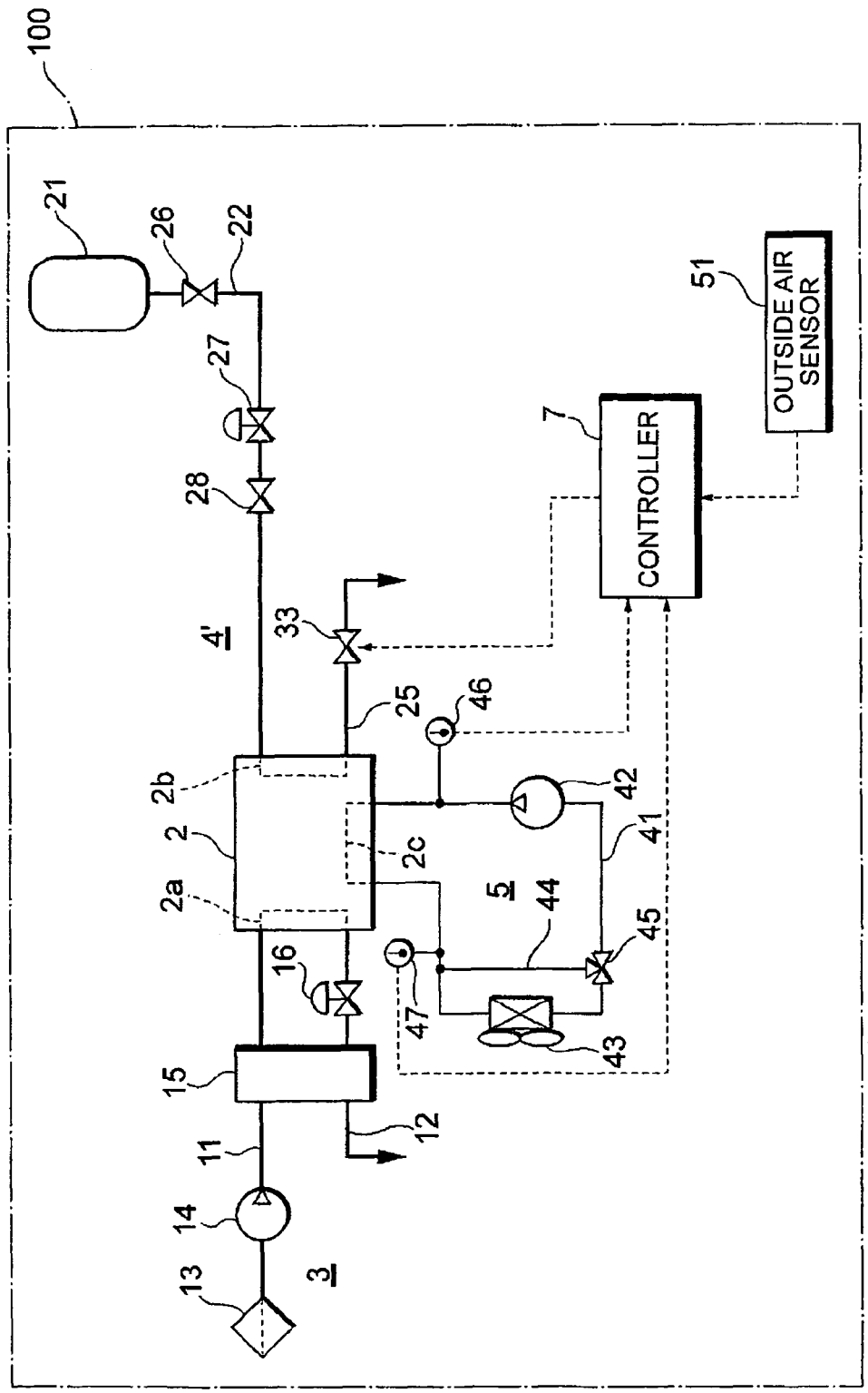
FIG. 3 is a block diagram of a fuel cell system according to a comparative example.

First, the fuel cell system 100 shown in FIG. 3 will briefly be described. The system is different from the fuel cell system 1 of FIG. 1 in a constitution in which a fuel gas piping system 4' of the fuel cell system 100 is not provided with a circulation path 23 and a pump 24 and in which a discharge path 25 for discharging a hydrogen off gas from a fuel cell 2 is provided with a purge valve 33. Another constitution is the same as that of the fuel cell system 1 of the first embodiment, so that the constitution is denoted with the same reference numerals as those of the first embodiment, and description thereof is omitted.

In the fuel cell system 100, a hydrogen gas and an oxidizing gas are supplied to the fuel cell 2. During an operation of the fuel cell system 100, the purge valve 33 is appropriately opened. In consequence, the hydrogen off gas is discharged to the downstream side of the discharge path 25, whereby a hydrogen concentration in a unit cell of the fuel cell 2 is secured.

Figure 4:
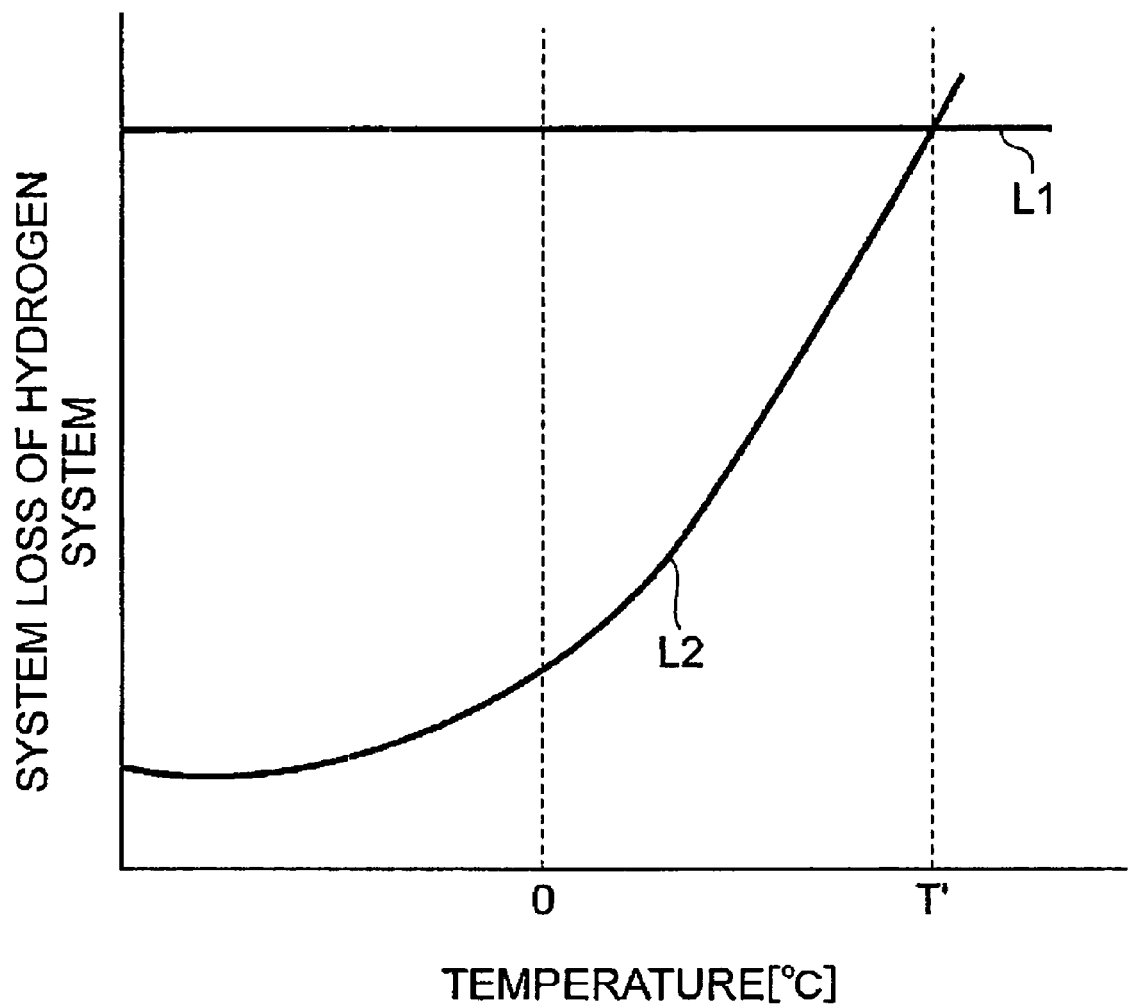
FIG. 4 is a graph showing a change of a system loss of a hydrogen system with respect to a temperature of a fuel cell.

FIG. 4 is a graph showing a change of a system loss of a hydrogen system with respect to a temperature of the fuel cell 2. Here, the temperature of the fuel cell 2 is a temperature detected by a temperature sensor 47 as described above. The hydrogen system corresponds to the fuel gas piping system 4 of FIG. 1, and corresponds to the fuel gas piping system 4' of FIG. 3. Therefore, the system loss of the circulation type hydrogen system in FIG. 1 is obtained by adding up a power loss of the pump 23 and a purge loss of the hydrogen off gas due to the opening of the purge valve 33. On the other hand, the system loss of the circulation-less type hydrogen system in FIG. 3 includes a purge loss of the hydrogen off gas due to the valve opening of the purge valve 33.

A line L1 shown in FIG. 4 shows the system loss of the hydrogen system in a case where during the operation of the fuel cell system 1 of FIG. 1, the pump 24 is driven and the purge valve 33 is opened and closed regardless of the temperature of the fuel cell 2. The line L1 indicates that the system loss of the hydrogen system is substantially constant regardless of the temperature of the fuel cell 2.

A curve L2 shown in FIG. 4 shows a system loss of a hydrogen system in a case where the purge valve 33 is opened and closed during the operation of the fuel cell system 100 of FIG. 3. As described above, when the temperature of the fuel cell 2 rises, the hydrogen gas concentration in the fuel cell 2 lowers. Therefore, in the fuel gas piping system 4' of FIG. 3, to secure the hydrogen gas concentration in the fuel cell 2, an amount of the gas to be purged via the purge valve 33 needs to be increased based on the rise of the temperature of the fuel cell 2. Therefore, the curve L2 indicates that the system loss of the hydrogen system (the purge loss) increases based on the temperature rise of the fuel cell 2.

It is to be noted that in the fuel gas piping system 4 of FIG. 1, in a case where without driving the pump 24, the purge valve 33 is only opened and closed to secure the hydrogen concentration in the fuel cell 2, the system loss of the hydrogen system at this time is supposed to substantially correspond to the curve L2. That is, the curve L2 substantially indicates the system loss of the fuel gas piping system 4 in a case where the driving of the pump 24 is stopped.

As seen from the line L1 and the curve L2, the system loss of the hydrogen system shown by the curve L2 is smaller than that shown by the line L1 until the line intersects with the curve at a temperature T' (provided that T'>0). Moreover, when the temperature T' shifts, the system loss of the hydrogen system indicated by the line L1 is smaller than that indicated by the curve L2. To analyze this, it is supposedly preferable that fuel gas piping system 4 executes the curve L2 till the temperature T' and executes the line L1 after the temperature T', to minimize the system loss of the hydrogen system in consideration of the temperature of the fuel cell 2.

Accordingly, in the fuel cell system 1 of the second embodiment, during the startup of the system, the driving of the pump 24 is stopped till the temperature T', and the driving of the pump 24 is started at the temperature T'. That is, in the second embodiment, the temperature $T_1$ shown in the step S2 of FIG. 2 is the temperature T', and the temperature $T_2$ shown in the step S4 is also set to the temperature T'. The temperature T' is 20 to 30° C. in, for example, the fuel cell 2 of a solid polymer type.

As described above, according to the fuel cell system 1 of the second embodiment, the driving and the stopping of the pump 24 are switched based on the reversing temperature T'. Therefore, the loss of the fuel gas piping system 4 can further be reduced, and the system efficiency can further be improved as a whole. Moreover, according to the second embodiment, damage to the pump 24 due to freezing can be avoided, and function and effect other than those described in the first embodiment can thus be produced. It is to be noted that the temperatures $T_1$ and $T_2$ may be set to a temperature lower than the temperature T'.

Third Embodiment

Next, a different respect of a fuel cell system 1 according to a third embodiment will mainly be described with reference to FIGS. 3 and 5. The embodiment is different from the first embodiment in that the temperatures $T_1$ and $T_2$ shown in FIG. 2 are changed. In the same manner as in the second embodiment, these temperatures $T_1$ and $T_2$ are set by comparison with the fuel cell system 100 of FIG. 3.

Figure 5:
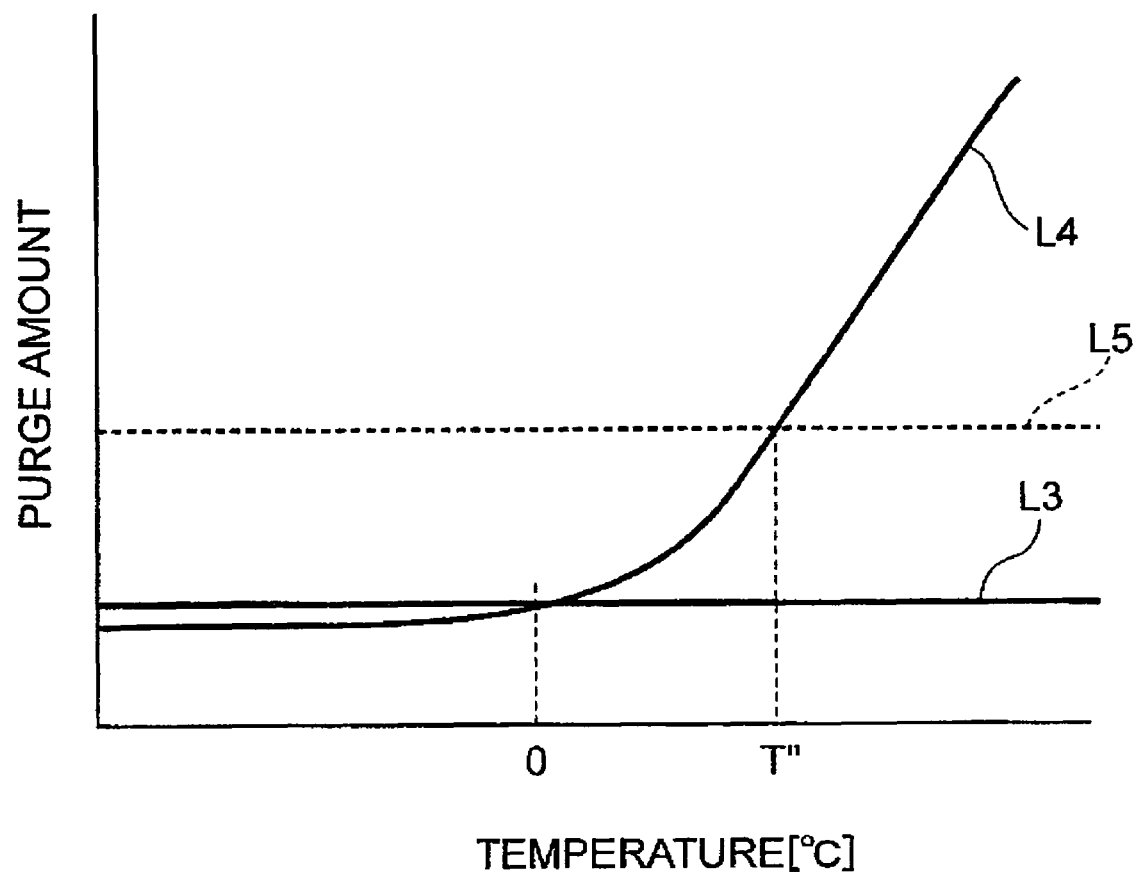
FIG. 5 is a graph showing a change of a purge amount with respect to the temperature of the fuel cell.

FIG. 5 is a graph showing a change of a purge amount with respect to a temperature of the fuel cell 2. As described above, the purge amount is an amount of a hydrogen off gas to be discharged to the downstream side of the purge valve 33. A line L3 shown in FIG. 5 shows the purge amount during an operation of the fuel cell system 1 of FIG. 1 (during driving of a pump 24). The line L3 indicates that the purge amount is substantially constant regardless of a temperature of the fuel cell 2.

A curve L4 shown in FIG. 5 shows a purge amount during an operation of the fuel cell system 100 of FIG. 3. As described above, when the temperature of the fuel cell 2 rises, a hydrogen gas concentration in the fuel cell 2 lowers. Therefore, in a fuel gas piping system 4' of FIG. 3, to secure the hydrogen gas concentration in the fuel cell 2, the purge amount needs to be increased based on the rise of the temperature of the fuel cell 2. Therefore, the curve L4 indicates that the purge amount increases based on the temperature rise of the fuel cell 2.

It is to be noted that in the fuel gas piping system 4 of FIG. 1, in a case where without driving the pump 24, the purge valve 33 is only opened and closed to secure the hydrogen concentration in the fuel cell 2, the purge amount at this time is supposed to substantially correspond to the purge amount indicated by the curve L4. That is, the curve L4 substantially indicates the purge amount in a case where the purge valve 33 is opened or closed in a state in which the driving of the pump 24 is stopped.

A line L5 shown in FIG. 5 shows a purge amount according to an exhaust safety standard. That is, according to design of the fuel cell system, it is necessary that the purge amount of the hydrogen off gas does not exceed an allowable amount indicated by the line L5. The line L5 intersects with the curve L4 at a temperature T" (a first temperature).

In the fuel cell system 1 of the third embodiment, during startup of the system, the driving of the pump 24 is stopped till the temperature T", and the driving of the pump 24 is started at the temperature T". That is, in the third embodiment, the temperature $T_1$ shown in the step S2 of FIG. 2 is the temperature T", and the temperature $T_2$ shown in the step S4 is also set to the temperature T".

Therefore, according to the fuel cell system 1 of the third embodiment, the driving and the stopping of the pump 24 are switched based on the temperature T". In consequence, the purge amount can appropriately be reduced, and the system efficiency can be improved as a whole. Moreover, according to the third embodiment, damage to the pump 24 due to freezing can be avoided, and function and effect other than those described in the first embodiment can thus be produced. It is to be noted that the temperatures $T_1$ and $T_2$ may be set to a temperature lower than the temperature T".

INDUSTRIAL APPLICABILITY

A fuel cell system 1 of the present invention can be mounted on a mobile body other than a two-wheel or four-wheel vehicle, an airplane, a ship, a robot or the like. Moreover, the fuel cell system 1 may be stationary, and may be incorporated in a cogeneration system.

The invention claimed is:

1. A fuel cell system comprising:
a fuel gas circulation system having a circulation path which circulates, through a fuel cell, a fuel off gas discharged from the fuel cell, and a circulation pump which feeds under pressure the fuel off gas in the circulation path;
a purge passage which is connected to the circulation path and which discharges the fuel off gas;
a purge valve which opens and closes the purge passage; and
a controller programmed to output a control signal to the circulation pump such that the stop of the driving of the circulation pump is maintained by the controller at a time when the fuel cell system is started at a predetermined low temperature, the controller further programmed to output control signals to open and close the purge valve in a state where the stop of the driving of the circulation pump is maintained,
wherein the fuel cell generates a power in a state where the stop of the driving of the circulation pump is maintained, and the fuel off gas is warmed by heat due to the power generation of the fuel cell and is introduced into the circulation pump, and
wherein when the temperature of the fuel cell exceeds a second temperature higher than the predetermined low temperature, the controller is further programmed to output a control signal to allow the driving of the circulation pump.

2. The fuel cell system according to claim 1, wherein the predetermined low temperature is a temperature of the fuel cell of 0'Celsius or less.

3. The fuel cell system according to claim 1, wherein the predetermined low temperature is an outside air temperature of 0'Celsius or less.

4. The fuel cell system according to claim 1, further comprising:
a temperature sensor which detects a temperature of the fuel cell.

5. The fuel cell system according to claim 1, further comprising:
  a purge valve which opens and closes the purge passage,
  wherein there is a first temperature at which a purge amount in a case where the purge valve is opened and closed in a state in which driving of the circulation pump is stopped is larger than an allowable amount, and
  the predetermined low temperature is the first temperature or less.

\* \* \* \* \*

UNITED STATES PATENT AND TRADEMARK OFFICE
CERTIFICATE OF CORRECTION

PATENT NO. : 8,835,066 B2
APPLICATION NO. : 12/087114
DATED : September 16, 2014
INVENTOR(S) : Yoshiaki Naganuma Page 1 of 1

It is certified that error appears in the above-identified patent and that said Letters Patent is hereby corrected as shown below:

In the Claims

At column 10, line 60, Claim 2, change "0'Celsius" to -- 0° Celsius --.

At column 10, line 63, Claim 3, change "0'Celsius" to -- 0° Celsius --.

Signed and Sealed this
Sixteenth Day of June, 2015

Michelle K. Lee
*Director of the United States Patent and Trademark Office*